US008473868B1

(12) United States Patent
Kauffman

(10) Patent No.: US 8,473,868 B1
(45) Date of Patent: Jun. 25, 2013

(54) SYSTEM AND METHOD FOR REVERSE HIERARCHICAL NAVIGATION WITHIN A USER INTERFACE

(75) Inventor: Jeffrey R. Kauffman, Brier, WA (US)

(73) Assignee: ARRIS Group, Inc., Suwanee, GA (US)

( * ) Notice: Subject to any disclaimer, the term of this patent is extended or adjusted under 35 U.S.C. 154(b) by 1169 days.

(21) Appl. No.: 11/608,701

(22) Filed: Dec. 8, 2006

Related U.S. Application Data

(60) Provisional application No. 60/863,311, filed on Oct. 27, 2006.

(51) Int. Cl.
*G06F 3/00* (2006.01)

(52) U.S. Cl.
USPC ........... 715/854; 715/810; 715/819; 715/820; 725/39

(58) Field of Classification Search
USPC ................... 715/810, 819, 820, 854
See application file for complete search history.

(56) References Cited

U.S. PATENT DOCUMENTS

| | | | |
|---|---|---|---|
| 5,546,529 A | 8/1996 | Bowers et al. | |
| 5,583,560 A | 12/1996 | Florin et al. | |
| 5,606,374 A | 2/1997 | Bertram | |
| 5,633,657 A | 5/1997 | Falcón | |
| 5,781,872 A | 7/1998 | Konishi et al. | |
| 6,002,394 A | 12/1999 | Schein et al. | |
| 6,025,843 A * | 2/2000 | Sklar | 715/841 |
| 6,040,829 A | 3/2000 | Croy et al. | |
| 6,118,492 A | 9/2000 | Milnes et al. | |
| 6,177,931 B1 | 1/2001 | Alexander et al. | |
| 6,201,540 B1 | 3/2001 | Gallup et al. | |
| 6,266,098 B1 * | 7/2001 | Cove et al. | 348/563 |
| 6,281,940 B1 | 8/2001 | Sciammarella | |
| 6,292,188 B1 | 9/2001 | Carlson et al. | |
| 6,411,337 B2 | 6/2002 | Cove et al. | |
| 6,445,306 B1 | 9/2002 | Trovato et al. | |
| 6,481,011 B1 | 11/2002 | Lemmons | |
| 6,492,997 B1 | 12/2002 | Gerba et al. | |
| 6,522,342 B1 | 2/2003 | Gagnon et al. | |
| 6,535,888 B1 | 3/2003 | Vijayan et al. | |

(Continued)

OTHER PUBLICATIONS

Office Action mailed Dec. 13, 2007, for U.S. Appl. No. 10/186,209, filed Jun. 27, 2002.

(Continued)

*Primary Examiner* — Ryan Pitaro
(74) *Attorney, Agent, or Firm* — Troy A. Van Aacken; Robert J. Starr

(57) ABSTRACT

Systems and methods are provided for facilitating navigation of a hierarchy including a plurality of categories within a user interface. A method includes displaying a first set of categories in the hierarchy as respective graphical images along a first axis of a user interface. A reverse navigation option is also displayed along the first axis with the first set of categories. The method continues by allowing the first set of categories and the reverse navigation option to be scrolled along the first axis to place the reverse navigation option within a focus area of the user interface. In response to the reverse navigation option being placed within the focus area, the user interface displays one or more ancestor categories of the first categories as respective graphical images along a second axis of the user interface. In response to an ancestor category being selected from the second axis, the user interface replaces the first categories with second categories along the first axis. The second categories include the selected ancestor category and one or more sibling categories of the selected ancestor category.

43 Claims, 17 Drawing Sheets

U.S. PATENT DOCUMENTS

| | | | |
|---|---|---|---|
| 6,564,378 B1 | 5/2003 | Satterfield et al. | |
| 6,670,974 B1 | 12/2003 | McKnight et al. | |
| 6,690,391 B1 * | 2/2004 | Proehl et al. | 715/720 |
| 6,698,021 B1 | 2/2004 | Amini et al. | |
| 6,725,215 B2 | 4/2004 | Yamamoto | |
| 6,728,675 B1 | 4/2004 | Maddalozzo, Jr. et al. | |
| 6,756,997 B1 | 6/2004 | Ward, III et al. | |
| 6,765,557 B1 * | 7/2004 | Segal et al. | 345/173 |
| 6,789,263 B1 | 9/2004 | Shimada et al. | |
| 6,966,037 B2 * | 11/2005 | Fredriksson et al. | 715/830 |
| 7,055,104 B1 * | 5/2006 | Billmaier et al. | 715/765 |
| 7,065,710 B2 | 6/2006 | Hayashi et al. | |
| 7,076,734 B2 | 7/2006 | Wolff et al. | |
| 7,159,176 B2 | 1/2007 | Billmaier et al. | |
| 7,260,829 B1 | 8/2007 | Hendricks et al. | |
| 7,353,461 B2 * | 4/2008 | Davidsson et al. | 715/810 |
| 2002/0054068 A1 | 5/2002 | Ellis et al. | |
| 2002/0174444 A1 | 11/2002 | Gatto et al. | |
| 2003/0048291 A1 | 3/2003 | Dieberger | |
| 2003/0184578 A1 | 10/2003 | Cowperthwaite | |
| 2004/0233239 A1 | 11/2004 | Lahdesmaki | |
| 2005/0066278 A1 * | 3/2005 | Sloo et al. | 715/716 |
| 2005/0172319 A1 | 8/2005 | Reichardt et al. | |
| 2005/0210410 A1 * | 9/2005 | Ohwa et al. | 715/821 |
| 2005/0235209 A1 * | 10/2005 | Morita et al. | 715/716 |
| 2005/0235316 A1 * | 10/2005 | Ahmad-Taylor | 725/44 |
| 2005/0283804 A1 * | 12/2005 | Sakata et al. | 725/52 |
| 2007/0136681 A1 | 6/2007 | Miller | |
| 2007/0168413 A1 | 7/2007 | Barletta et al. | |
| 2007/0256031 A1 * | 11/2007 | Martin et al. | 715/854 |
| 2008/0010613 A1 * | 1/2008 | Narioka et al. | 715/841 |
| 2008/0052123 A1 * | 2/2008 | Iliff | 705/2 |
| 2008/0059911 A1 | 3/2008 | Kulo et al. | |

OTHER PUBLICATIONS

Office Action mailed Dec. 13, 2007, for U.S. Appl. No. 10/186,210, filed Jun. 27, 2002.
Office Action mailed Dec. 13, 2007, for U.S. Appl. No. 10/113,889, filed Mar. 29, 2002.
Office Action mailed Dec. 26, 2007, for U.S. Appl. No. 10/105,088, filed Mar. 22, 2002.
Office Action mailed Jan. 24, 2008, for U.S. Appl. No. 10/108,178, filed Mar. 27, 2002.
Office Action mailed Jan. 22, 2008, for U.S. Appl. No. 10/260,738, filed Sep. 30, 2002.
Office Action mailed Mar. 5, 2008, for U.S. Appl. No. 10/328,754, filed Dec. 23, 2002.
Office Action mailed Oct. 19, 2006, for U.S. Appl. No. 10/097,174, filed Mar. 12, 2002.
Office Action mailed May 4, 2007, for U.S. Appl. No. 10/097,174, filed Mar. 12, 2002.
Office Action mailed Jan. 11, 2007, for U.S. Appl. No. 10/105,088, filed Mar. 22, 2002.
Office Action mailed Jul. 6, 2007, for U.S. Appl. No. 10/105,088, filed Mar. 22, 2002.
Office Action mailed Jun. 13, 2007, for U.S. Appl. No. 10/108,178, filed Mar. 27, 2002.
Office Action mailed Jan. 3, 2007, for U.S. Appl. No. 10/113,889, filed Mar. 29, 2002.
Office Action mailed Jun. 15, 2007, for U.S. Appl. No. 10/113,889, filed Mar. 29, 2002.
Office Action mailed Nov. 29, 2006, for U.S. Appl. No. 10/107,601, filed Mar. 27, 2002.
Office Action mailed Jun. 20, 2007, for U.S. Appl. No. 10/107,601, filed Mar. 27, 2002.
Office Action mailed May 24, 2007, for U.S. Appl. No. 10/186,209, filed Jun. 27, 2002.
Office Action mailed Jul. 5, 2007, for U.S. Appl. No. 10/186,210, filed Jun. 27, 2002.
Office Action mailed Jun. 29, 2007, for U.S. Appl. No. 10/328,754, filed Dec. 23, 2002.
Office Action mailed Jul. 8, 2009, for U.S. Appl. No. 11/608,719, filed Dec. 8, 2006.

* cited by examiner

SYSTEM AND METHOD FOR REVERSE HIERARCHICAL NAVIGATION WITHIN A USER INTERFACE

CROSS-REFERENCE TO RELATED APPLICATIONS

This application claims the benefit of U.S. Provisional Application No. 60/863,311, filed Oct. 27, 2006, for "ITV Hierarchy Navigation," which is fully incorporated herein by reference.

TECHNICAL FIELD

This disclosure relates generally to user interfaces. More specifically, this disclosure relates to navigating one or more hierarchies of information within a user interface.

BRIEF DESCRIPTION OF THE DRAWINGS

Non-limiting and non-exhaustive embodiments of the disclosure are described, including various embodiments of the disclosure with reference to the figures, in which.

DETAILED DESCRIPTION

Figure 1:
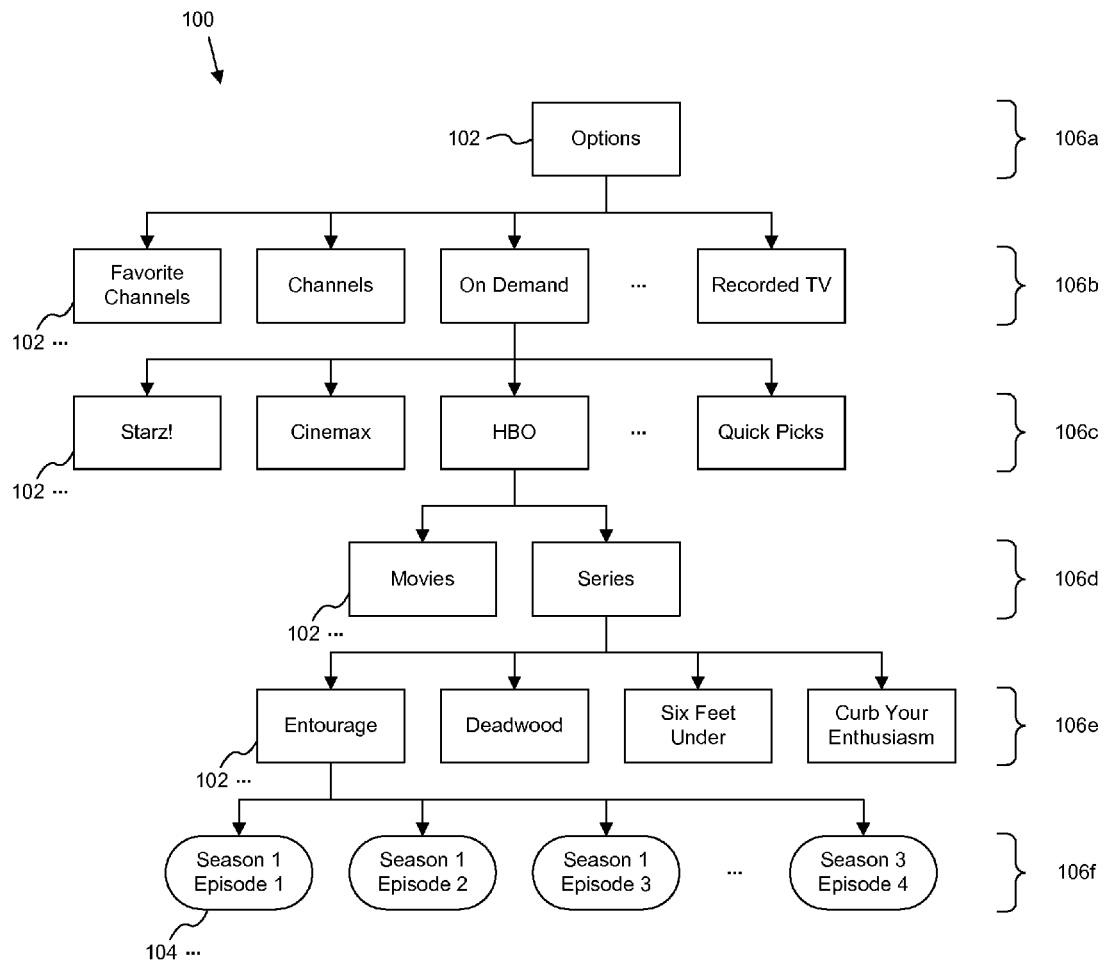
FIG. 1 is a representation of an exemplary hierarchy including a number of categories for organizing information assets.

Graphical user interfaces (generally referred to herein as "user interfaces") provide an intuitive mechanism for interacting with various forms of information in a computer. Frequently, the information is arranged hierarchically, in which one or more root or parent categories of information branch downward through successive levels of child categories. For this reason, hierarchies are often equated with inverted tree structures.

In some cases, a user interface may only show categories within a single level of the hierarchy. For example, a display screen may be too small to effectively show more than a few categories at once. This is especially true for low-resolution display devices, such as television sets. Because only a single level of the hierarchy is displayed, the user can become lost or disoriented within the hierarchy.

In one embodiment, a user interface displays a first set of categories corresponding to a level of a hierarchy as respective graphical images. The images may be linearly arranged along a first axis of the user interface. A user may be allowed to scroll the first set of categories along the first axis to place a particular category within a focus area of the user interface.

A user may be allowed to affirmatively select the category in the focus area. In response, the user interface may replace the first set of categories with a second set of categories. The second set of categories may comprise, in one embodiment, one or more children or sub-categories in the hierarchy of the selected category.

To prevent the user from becoming disoriented within the hierarchy, the user interface may add an indication of the selected category to a separate navigation context area of the user interface. The navigation context area may be displayed, for instance, along the bottom portion of the user interface.

The user may continue to scroll the categories along the first axis and make additional selections. For each category subsequently selected within the focus area, the user interface replaces the currently displayed set of categories with a new set of categories, the new set of categories comprising one or more children in the hierarchy of the subsequently selected category. In addition, the user interface may add an indication of the subsequently selected category to the navigation context area.

In one embodiment, each new indication of a subsequently selected category is displayed adjacent to the previously selected category along a linear axis. In certain embodiments, the indications may comprise the names of the respective categories, and the names may be separated by a delimiter, such as a slash character.

In other embodiments, the indications within the navigation context area may be represented as smaller versions of the graphical images associated with the categories. In still other embodiments, the navigation context area may include a graphical representation of the entire hierarchy, not simply a selected path through the hierarchy.

In one configuration, the user interface may display a set of child categories relative to the category in the focus area as respective graphical images along a second axis of the user interface. The second axis may intersect the first axis at the focus area and may be perpendicular to the first axis.

The set of child categories along the second axis may likewise be scrollable to place a particular child category in the focus area. In response to a child category in the focus area being selected, the user interface may replace the set of categories along the first axis with a set of grandchild categories (relative to the child category that was originally in the focus area). Thus, a user may be able to easily select from categories in two different levels of the hierarchy, allowing the user to find what he or she is looking for with a minimum number of operations.

In certain embodiments, to allow the user to return to an ancestor level in the hierarchy, the user interface may display a reverse navigation option as a graphical image along the first axis with a set of categories (e.g., the first or second set discussed above) corresponding to a level of the hierarchy. The user may be allowed to scroll the reverse navigation option with the set of categories along the first axis so as to place the reverse navigation option within the focus area of the user interface.

After the reverse navigation option is placed in the focus area, the user interface may display one or more ancestor categories respective to the set of categories along the second axis. The user may be allowed to select a particular ancestor category from the second axis. For example, the second axis may be scrollable so as to place the particular ancestor category in the focus area where the user may affirmatively select the particular ancestor category.

In response to the particular ancestor category being selected from the second axis, the user interface may replace the set of categories displayed along the first axis with the selected ancestor category and one or more sibling categories relative to the selected ancestor category. Thus, the user may scroll and select the selected ancestor category or one of its siblings from the first axis, as discussed above.

The embodiments of the disclosure will be best understood by reference to the drawings, wherein like elements are designated by like numerals throughout. In the following description, numerous specific details are provided for a thorough understanding of the embodiments described herein. However, those of skill in the art will recognize that one or more of the specific details may be omitted, or other methods, components, or materials may be used. In some cases, operations are not shown or described in detail.

Furthermore, the described features, operations, or characteristics may be combined in any suitable manner in one or more embodiments. It will also be readily understood that the order of the steps or actions of the methods described in connection with the embodiments disclosed may be changed as would be apparent to those skilled in the art. Thus, any order in the drawings or Detailed Description is for illustrative purposes only and is not meant to imply a required order, unless specified to require an order.

Embodiments may include various steps, which may be embodied in machine-executable instructions to be executed by a general-purpose or special-purpose computer (or other electronic device). Alternatively, the steps may be performed by hardware components that include specific logic for performing the steps or by a combination of hardware, software, and/or firmware.

Embodiments may also be provided as a computer program product including a machine-readable medium having stored thereon instructions that may be used to program a computer (or other electronic device) to perform processes described herein. The machine-readable medium may include, but is not limited to, hard drives, floppy diskettes, optical disks, CD-ROMs, DVD-ROMs, ROMs, RAMs, EPROMs, EEPROMs, magnetic or optical cards, solid-state memory devices, or other types of media/machine-readable medium suitable for storing electronic instructions. For example, instructions for performing described processes may be transferred from a remote computer (e.g., a server) to a requesting computer (e.g., a client) by way of data signals via a communication link (e.g., network connection).

Several aspects of the embodiments described will be illustrated as software modules or components. As used herein, a software module or component may include any type of computer instruction or computer executable code located within a memory device and/or transmitted as electronic signals over a system bus or wired or wireless network. A software module may, for instance, comprise one or more physical or logical blocks of computer instructions, which may be organized as a routine, program, object, component, data structure, etc., that performs one or more tasks or implements particular abstract data types.

In certain embodiments, a particular software module may comprise disparate instructions stored in different locations of a memory device, which together implement the described functionality of the module. Indeed, a module may comprise a single instruction or many instructions, and may be distributed over several different code segments, among different programs, and across several memory devices. Some embodiments may be practiced in a distributed computing environment where tasks are performed by a remote processing device linked through a communications network. In a distributed computing environment, software modules may be located in local and/or remote memory storage devices. In addition, data being tied or rendered together in a database record may be resident in the same memory device, or across several memory devices, and may be linked together in fields of a record in a database across a network.

FIG. 1 is a representation of an exemplary hierarchy 100 including a number of categories 102 for organizing information assets 104. As illustrated, the assets 104 may comprise video-on-demand (VOD) programs. However, an artisan will recognize that the assets 104 may include a variety of different types of information and/or media, such as video programs, audio programs, digital photographs, text documents, application programs, interactive functions, menu options, etc.

Each category 102 in the hierarchy 100 may include one or more child categories 102 and/or assets 104. Furthermore, the hierarchy 100 may be logically divided into a number of levels 106 comprising one or more sibling categories 102. The depicted hierarchy 100 includes six levels 106*a-f* starting with a root level 106*a* containing a single category 102 ("Options"). The children of the "Options" category 102 include "Favorite Channels," "Channels," "On Demand," and "Recorded TV," all of which are siblings in the next level 106*b* of the hierarchy 100. Due to the hierarchy's inverted tree structure, it will be variously referred to herein as a category tree or option tree.

Figure 2:
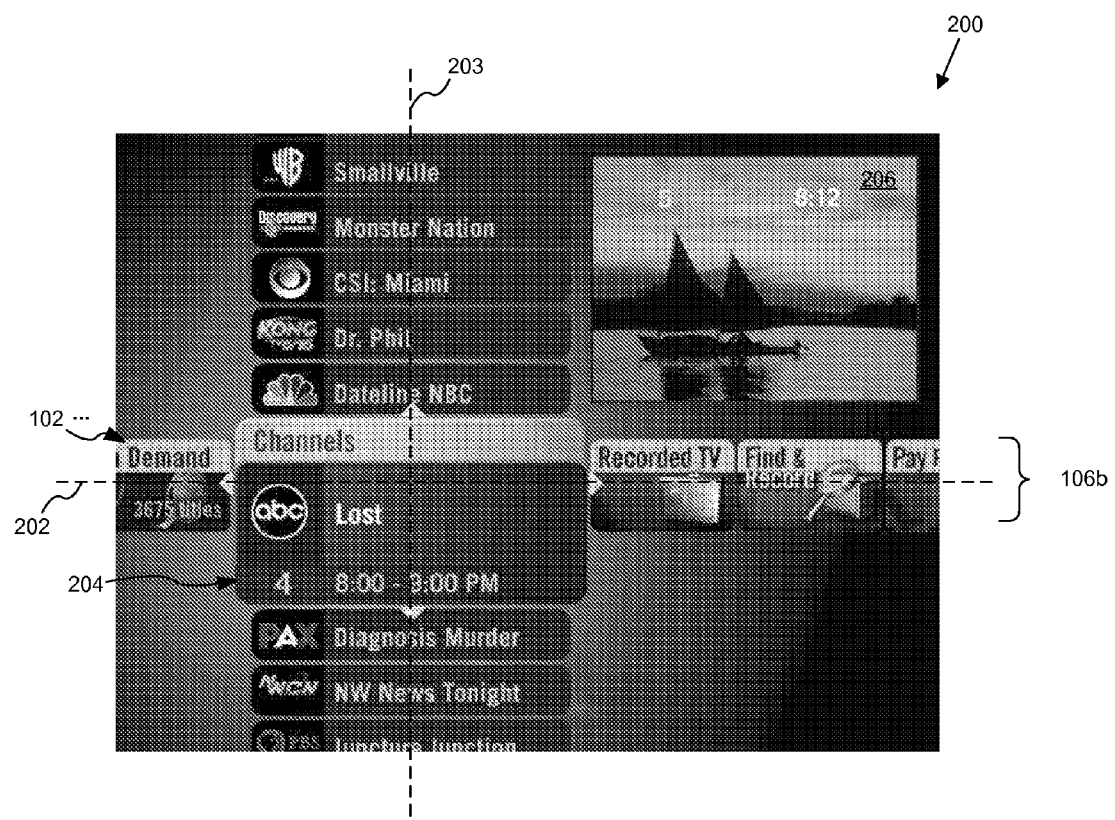
FIG. 2 is a first view of an exemplary user interface for navigating the hierarchy of FIG. 1.

FIG. 2 illustrates an exemplary user interface 200 for navigating a hierarchy 100 of the type illustrated in FIG. 1. The user interface 200 may be generated by a personal computer, television set top box (STB), personal digital assistant (PDA), mobile phone, or other suitable computing device, for display on a computer monitor, television set, integrated LCD display, or the like.

In one embodiment, the user interface 200 includes a horizontal axis 202, a vertical axis 203, and a focus area 204. The focus area 204 may be a region of the user interface 200 at or near the intersection point of the two axes 202, 203. As depicted, the focus area 204 may be placed off-center within the user interface 200, such that one of the quadrants created by the intersection of the two axes 202, 203 is larger than the others. In such a configuration, the larger quadrant may include a miniature video window 206 for displaying television programs, advertising, or the like.

Graphical representations of categories 102 and/or assets 104 from the hierarchy 100 may be aligned with, and scrolled along, the two axes 202, 203, allowing the categories 102 and/or assets 104 to be independently scrolled into and out of the focus area 204 from either axis 202, 203. In one configuration, the focus area 204 may display, at most, a single category 102 or asset 104 at a time.

As illustrated, a set of categories 102 from one of the levels 106 in the hierarchy 100 (e.g., level 106*b*) may be displayed along the horizontal axis 202. An artisan will recognize, however, that the roles of the two axes 202, 203 may be reversed in various embodiments. Thus, any reference herein to the horizontal axis 202 may be treated as a reference to the vertical axis 203 in an alternative embodiment, and vice versa.

In one embodiment, the set of categories 102 may be scrolled along the horizontal axis 202 to place a particular category 102 (e.g., "Channels") into the focus area 204. The category 102 in the focus area 204 may be enlarged relative to the other categories 102 and may be configured to display additional or different information when compared to the categories 102 outside of the focus area 204.

In some cases, the set of categories 102 may be too large to be simultaneously displayed along the horizontal axis 202. Accordingly, a subset of the categories 102 may be initially displayed, and categories 102 may be rotated into and out of the user interface 200 as they are scrolled. In one embodiment, the scrolling of the categories 102 is circular, such that a category 102 scrolled off the right side of the user interface 200 will eventually reappear on the left side of the user interface 200 in a loop. Further, the horizontal axis 202 may include indicia at a point where the loop begins to repeat itself.

In one implementation, scrolling a category 102 into the focus area 204 from the horizontal axis 202 may result in a different set of categories 102 and/or assets 104 being displayed along the vertical axis 203. The items displayed along the vertical axis 203 may represent children in the hierarchy 100 of the category 102 in the focus area 204. The vertical axis 203 may be immediately populated after a category 102 is scrolled into the focus area 204 from the horizontal axis 202. Alternatively, the user may need to pause navigation and "linger" on a category 102 in the focus area 204 for a period of time (e.g., 0.5 seconds) before the vertical axis 203 is populated.

Figure 3:
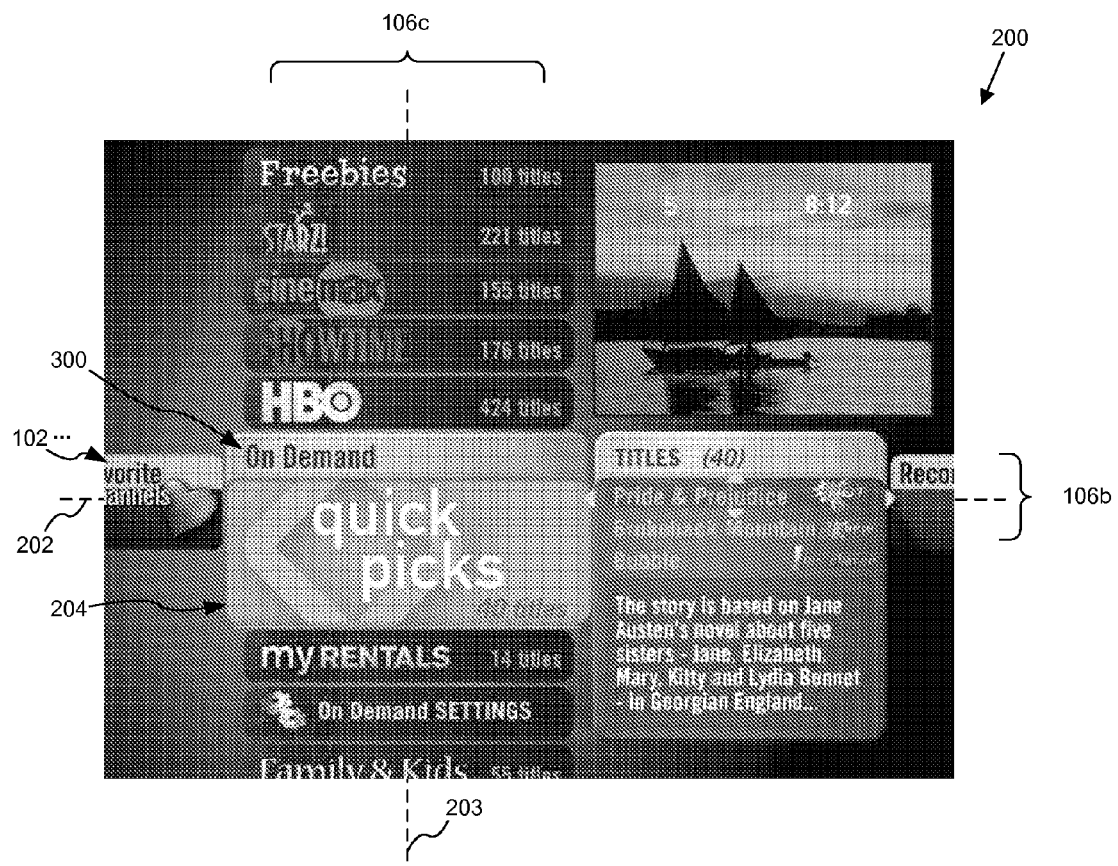
FIG. 3 is a second view of an exemplary user interface for navigating the hierarchy of FIG. 1.

FIG. 3 illustrates the user interface 200 after the set of categories 102 along the horizontal axis 202 has been scrolled one position to the right. The "On Demand" category 102, which was previously displayed to the left of the focus area 204 in FIG. 2, is now depicted within the focus area 204. As explained above, the children of the "On Demand" category 102 (e.g., level 106c) may be displayed along the vertical axis 203. Thus, in one embodiment, the horizontal axis 202 displays sibling categories 102 in the "current" hierarchical level 106b, while the vertical axis 203 displays sibling categories 102 in the next deeper hierarchical level 106c that are children of the category 102 in the focus area 204.

As noted above, the categories 102 along the vertical axis 203 may also be scrolled through the focus area 204. A context bar 300 displayed in connection with (within or adjacent to) the focus area 204 may indicate the name of the parent of the sibling categories 102 being scrolled through the focus area 204. For instance, as shown in FIG. 3, the vertical axis 203 contains level 106c of the hierarchy 100 that represent children of the "On Demand" category 102. Accordingly, the context bar 300 may display the name, "On Demand," to indicate the parent category 102 of the items being scrolled through the focus area 204.

Figure 4:
FIG. 4 is a third view of an exemplary user interface for navigating the hierarchy of FIG. 1.

In one embodiment, a user may affirmatively select the category 102 within the focus area 204, such as by pressing a selection button (not shown) on a remote control. In response, the user interface 200 may replace the categories 102 along the horizontal axis 202 with a set of child categories 102 relative to the selected category 102. As illustrated in FIG. 4, the set of child categories 102 may represent the next deeper level 106 (e.g., level 106c) in the hierarchy 100. This new level 106c of categories 102 may likewise be scrolled along the horizontal axis 202, allowing the user to selectively place a desired category 102 within the focus area 204.

The user may continue the process of scrolling and selecting categories 102 to navigate the levels 106 of the hierarchy 100 until reaching a level 106 (e.g., level 106f of FIG. 1) containing one or more assets 104. When an asset 104 is selected, the user will be able to watch, listen to, read, or otherwise interact with the selected asset 104.

Unfortunately, as noted above, the user may become lost or disoriented during hierarchical navigation. Because the horizontal axis 202 only displays a single level 106 of the hierarchy 100, the user may temporarily lose track of how deep he or she is within the hierarchy 100. Often, rather than navigating a few levels 106 higher in the hierarchy to explore alternative paths, the user may simply start over at the beginning of the hierarchy 100. This makes it more difficult and time consuming to find a desired asset 104, particularly within deep hierarchies 100.

Figure 5:
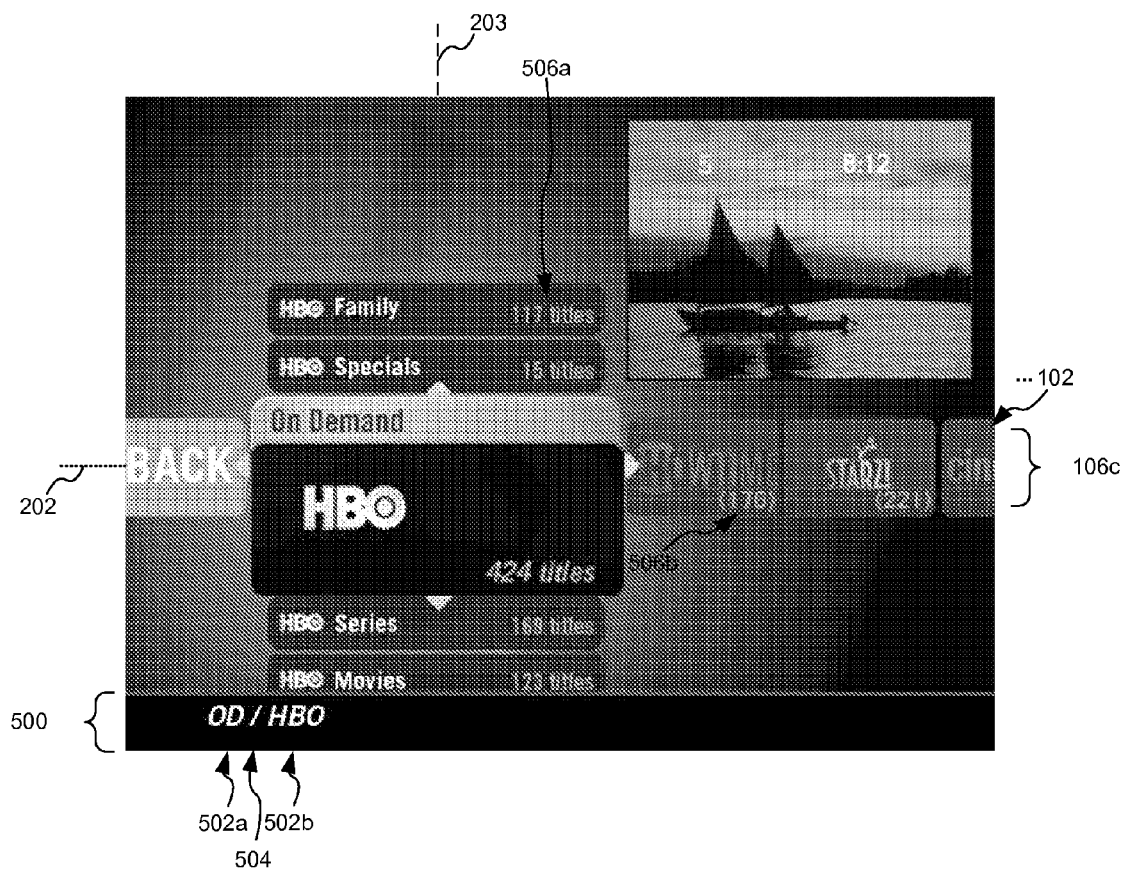
FIG. 5 is a fourth view of an exemplary user interface for navigating the hierarchy of FIG. 1 including an embodiment of a navigation context area.

Referring to FIG. 5, a separate navigation context area 500 may be provided to help the user maintain context during hierarchical navigation. In one configuration, the navigation context area 500 may be embodied as a region extending along the bottom of the user interface 200. However, an artisan will recognize that the navigation context area 500 could be located in other areas, such as along the top or one of the sides of the user interface 200 or in one of the quadrants formed by the two axes 202, 203.

Each time the user selects a category 102 in the focus area 204 while drilling down in the hierarchy 100, an indication 502 of the selected category 102 may be displayed in the navigation context area 500. As noted above, selection may be accomplished by pressing a button on a remote control when a desired category 102 is within the focus area 204. Another form of selection that may result in the indication 502 being displayed may be vertically scrolling the items displayed along vertical axis 203 once a category 102 from the horizontal axis 202 is brought into focus. In other words, the user may switch from navigating the horizontal axis 202 to navigating the vertical axis 203, which may result in an indication 502 of the "selected" category 102 from the horizontal axis 202 being displayed in the navigation context area 500.

The depicted navigation context area 500 shows two such indications 502a-b. The first indication 502a ("OD") may be displayed when the user selects the "On Demand" category 102 while it is in the focus area 204. The second indication 502b may be displayed when the user selects the "HBO" category 102, as shown in FIG. 4.

As illustrated, the indications 502a-b may be displayed linearly across the navigation context area 500. Moreover, each of the indications 502a-b may be separated by a delimiter 504, such as a slash character (e.g., "/" or "\"). An artisan will recognize that various other delimiters 504 may be used, such as dashes, carets, greater-than signs, or custom graphics. One advantage of a slash character may be to give the appearance of a file path, which is understood by many users to be a path through a file hierarchy or directory tree. It should be recognized, however, that the indications 502a-b within the navigation context area 500 need not correspond to actual file names within a directory tree and may be shortened or abbreviated ("OD" instead of "On Demand") in order to display as many indications 502 as possible within the navigation context area 500.

Should the navigation context area's practical limit of displayable characters be exceeded, an ellipsis (...) may be used to replace one or more indications 502 of categories 102. In one embodiment, the first two selected categories 102 will generally be displayed (e.g., "OD/HBO") as will the current category 102. Thereafter, as room permits, the next level up from the current category 102 may be added, and so on, until the remaining indications 502 need to be replaced with ellipses. Accordingly, a navigation context area 500 that displays "OD/HBO/ . . . / . . . / . . . /British Comedy/Slapstick" may indicate that the user is currently in the "Slapstick" category 102, which is contained within the "British Comedy" level, which may be contained in a "Foreign Hits" category 102 (not shown), which may be a child of a "Comedy" category 102 (not shown), which may be contained within a 'Movies' category 102 (not shown), which is ultimately contained within the "HBO" and "On Demand" categories 102.

In alternative embodiments, the indications 502 displayed in the navigation context area 500 need not be the names of the respective categories 102. For example, smaller versions of graphical images representing the categories 102, as displayed along the two axes 202, 203, may be shown in the navigation context area 500.

In still other embodiments, the navigation context area 500 may display a graphical representation or map of all or a substantial portion of the hierarchy 100. Thus, the navigation context area 500 may appear to be similar to the hierarchy 100 illustrated in FIG. 1. One of the categories 102 in the displayed hierarchy 100 may be visually emphasized through highlighting, enlargement, etc., to indicate the currently displayed level 106 and/or category 102, i.e., a "You are Here" indication (not shown). The map of the hierarchy 100 may be displayed, for example, within one of the quadrants formed by the two axes 202, 203.

In one embodiment, categories 102 displayed along one or both of the axes 202, 203 may include an asset count 506 indicating the number of assets 104 contained within the category 102 and any descendant (e.g., child, grandchild, etc.) categories 102. Thus, an asset count 506 for the "HBO Family" category 102 may indicate that 117 assets 104 are contained within the "HBO Family" category 102 and any descendant categories 102. Likewise, an asset count 506 for the "Showtime" category 102 may indicate that 176 assets 104 are contained within the "Showtime" category 102 and any descendant categories 102.

One of the difficulties with conventional VOD hierarchies is that a user is typically unaware of the number of assets 104 (VOD programs) available, both in terms of the overall number of VOD programs and the number of VOD programs in each category 102. As a result, VOD resources can be underutilized due to lack of consumer knowledge. The addition of asset counts 506 to the displayed categories 102 addresses this problem.

Figure 6:
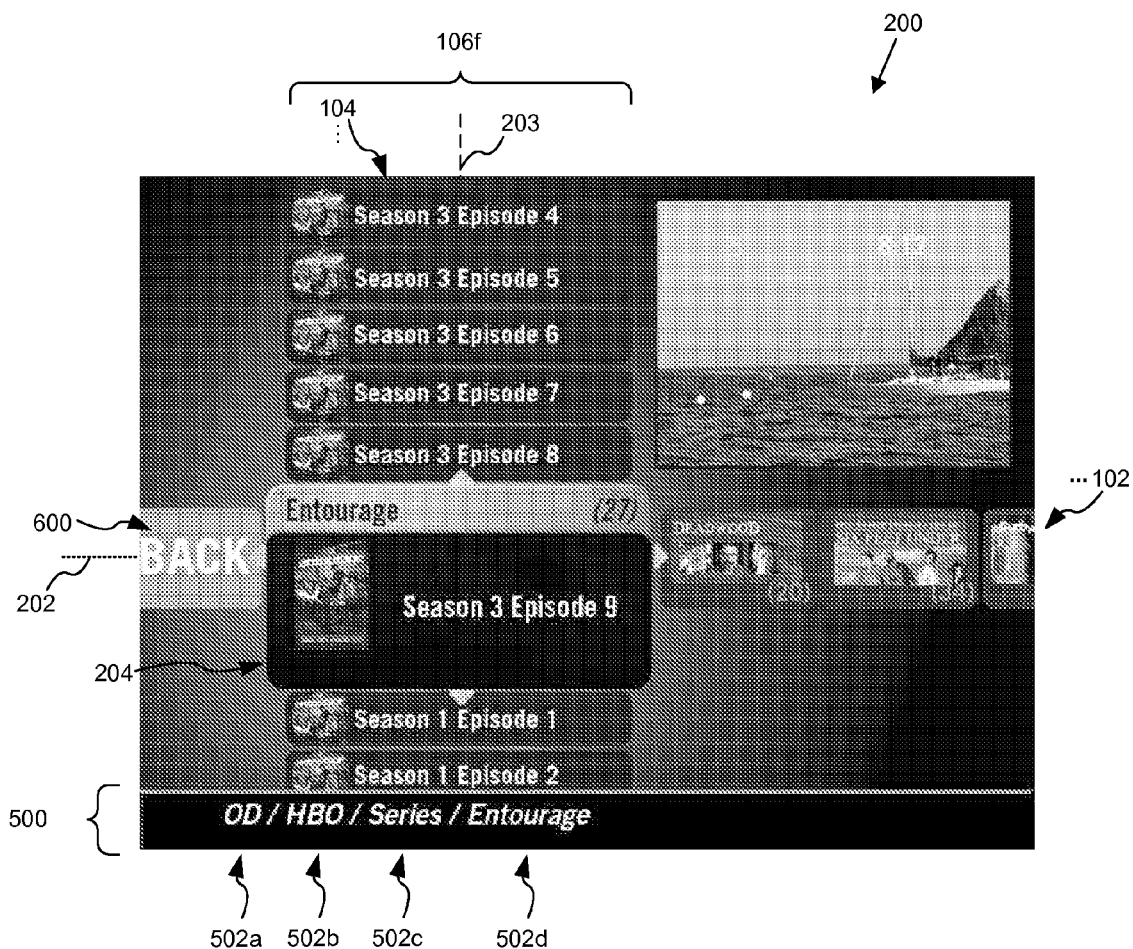
FIG. 6 is a fifth view of an exemplary user interface for navigating the hierarchy of FIG. 1 including an embodiment of a navigation context area.

FIG. 6 shows the user interface 200 after two additional selections of categories 102 have been made. The navigation context area 500 has been correspondingly updated to display new indications 502*c-d* of these selections, i.e., "Series" and "Entourage." As illustrated, the vertical axis 203 displays the children of the category 102 (e.g., "Entourage") in the focus area 204, which are assets 104 (VOD programs) rather than categories 102. A user may scroll one of the assets 104 into the focus area 204 and select that asset 104, which, in the depicted embodiment, may result in the associated VOD program being displayed.

In one embodiment, the user may navigate up (or back) through the hierarchy 100 to visit previously selected levels 106. As described in greater detail in connection with FIGS. 8-10 and 17, a reverse navigation option 600 may be added to the items along the horizontal axis 202. The reverse navigation option 600, when brought into the focus area 204 and selected, may allow the user return to the next highest level 106 in the hierarchy 100. For instance, in FIG. 6, the horizontal axis 202 is displaying level 106*e* of the hierarchy 100. In response to selecting the reverse navigation option 600, level 106*e* of the hierarchy 100 would be replaced with level 106*d*. In one embodiment, indication 502*d* will also be removed from the navigation context area 500 to provide the user with a current indication of his or her depth within the hierarchy 100. As described more fully hereafter, the reverse navigation option 600 may also be used to return to any of the previously-selected levels 106 of the hierarchy 100, which would result in the removal of the appropriate number of indications 502 from the navigation context area 500 to reflect the correct navigational depth within the hierarchy 100.

Figure 7:
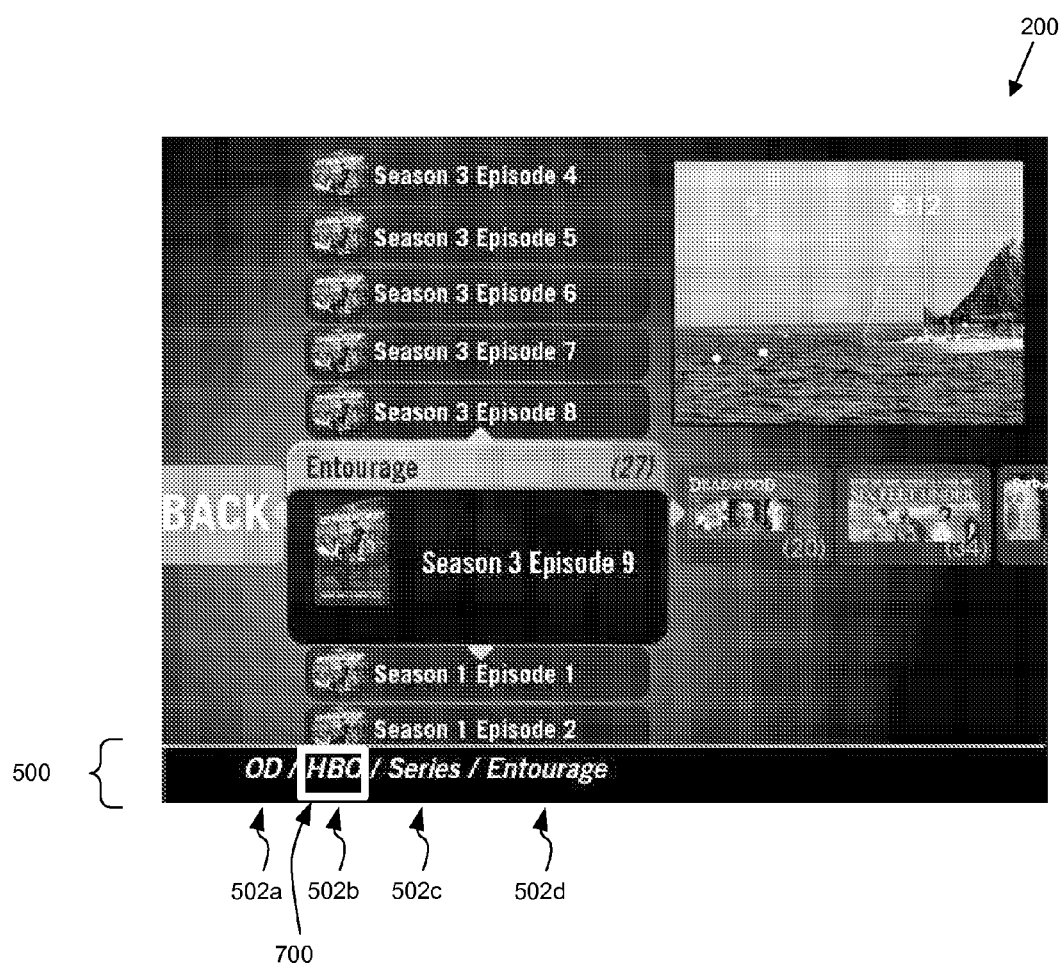
FIG. 7 is a sixth view of an exemplary user interface for navigating the hierarchy of FIG. 1 including an embodiment of a navigation context area.

In an alternative embodiment, as shown in FIG. 7, a user may be allowed to directly navigate the indications 502 within the navigation context area 500 in order to return to a previously selected level 106 of the hierarchy 100. For example, a user may press a button on a remote control (not shown) to switch from navigating the two axes 202, 203 to navigating the indications 502 of the navigational context area 500. In one configuration, left and right navigation commands will move a selection rectangle 700 between the various indications 502. In response to a selection command, the level 106 containing the category 102 of the selected indication 502 will be displayed along the horizontal axis 202. As illustrated in FIG. 7, the selection rectangle 700 is positioned around the "HBO" indicator 502*b*. In response to a selection command, the user interface 200 would return to its appearance in FIG. 5, i.e., level 106*c* will be displayed along the horizontal axis 202.

As discussed above, the user may desire to explore or otherwise select categories 102 or assets 104 related to a higher level 106 in the hierarchy 100. For example, when the horizontal axis 202 displays the categories 102 of level 106*d* (shown in FIG. 1), the user may decide to return to level 106*c* to select from a category 102 other than the current parent category 102 (e.g., the "HBO" category 102). Thus, the user may decide to select from the "Starz!" category 102, the "Cinemax" category 102, the "Showtime" category 102, or from another sibling category in level 106*c*.

Rather than requiring the user to restart the navigation process by returning to the root level 106*a*, in one embodiment, the user interface 200 graphically displays a number of ancestor categories 102 along the vertical axis 203 and allows the user to select one of the ancestor categories 102 in order to return to a desired level 106. Returning to the desired level 106 may include, for example, displaying the selected ancestor category 102 and its siblings, if any, along the horizontal axis 202.

Returning to FIG. 6, as discussed above, the user interface 200 may display a reverse navigation option 600 along the horizontal axis 202 with the sibling categories 102 (e.g., Entourage, Deadwood, Six Feet Under, etc.) of a current level 106 (e.g., level 106*e*). In this example, the reverse navigation option 600 is labeled as a "BACK" option. However, this label is not intended to be limiting and an artisan will recognize from the disclosure herein that any label, symbol, icon, or other indicia may be displayed in association with the reverse navigation option 600.

When a new level is selected according to one embodiment, the reverse navigation option 600 is initially displayed on a first side (e.g., left side) of the focus area 204 and the sibling categories 102 are initially displayed on a second side (e.g., right side) of the focus area 204 along the horizontal axis 202. This provides the user with a familiar orientation upon entering a hierarchy level 106. Initially displaying the reverse navigation option 600 in a viewable portion of the user interface 200, rather than requiring the user to initially scroll along the horizontal axis 202 before the reverse navigation option 600 comes into view, also provides the user with a reminder of the availability and functionality of the reverse navigation option 600. Further, initially displaying the reverse navigation option 600 adjacent to the focus area 204 allows the user to quickly select the reverse navigation option 600 for easy navigation back up the hierarchy 100.

Figure 8:
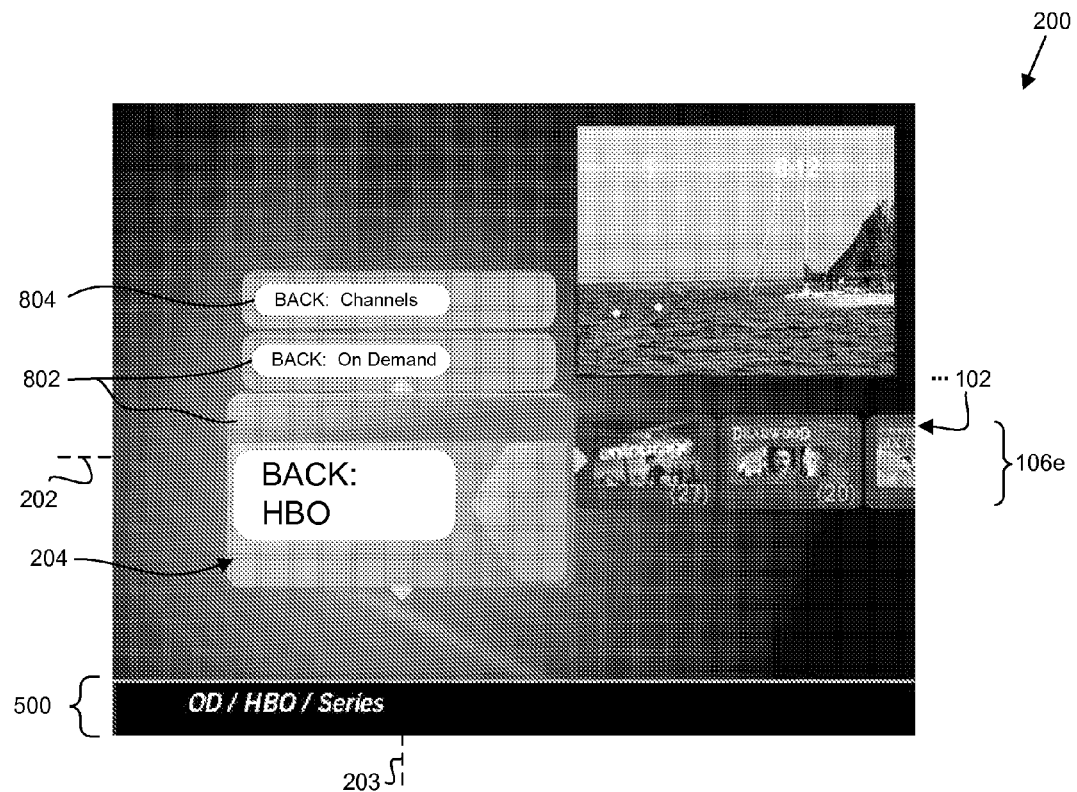
FIG. 8 is a seventh view of an exemplary user interface for navigating the hierarchy of FIG. 1 including an embodiment of a reverse navigation option.

In response to a user input, the user interface 200 scrolls the reverse navigation option 600 and the sibling categories 102 in the current level 106e along the horizontal axis 202 through the focus area 204. FIG. 8 illustrates the user interface 200 after the user has scrolled the reverse navigation option 600 into the focus area 204 according to one embodiment. As discussed above, in one embodiment, the user places the reverse navigation option 600 in the focus area 204 by "lingering" or pausing on the reverse navigation option 600 in the focus area 204 for a period of time (e.g., approximately 0.5 second or more).

In response to placing the reverse navigation option 600 in the focus area 204, the user interface 200 may display one or more ancestor categories 802 (two shown) along the vertical axis 203. In this example, the ancestor categories 802 are labeled as "BACK" categories and include "HBO" from level 106c and "On Demand" from level 106b shown in FIG. 1. An artisan will recognize from the disclosure herein that any label, symbol, icon, or other indicia may be displayed in association with the ancestor categories 802. Further, an artisan will recognize that fewer or more ancestor categories 802 may be displayed along the vertical axis 203 depending on the depth of the hierarchy 100 and the current level 106 displayed along the horizontal axis 202.

It is noted that the ancestor categories 802 displayed along the vertical axis 203 do not include the "Series" category from level 106d, since the children of that level 106 are already being displayed along the horizontal axis 202. Selection of the parent category 102 (e.g., Series) from the vertical axis 203 would not change the currently displayed categories 102 (e.g., Entourage, Deadwood, etc.) along the horizontal axis 202. Accordingly, the parent category 102 of the categories 102 along the horizontal axis 202 is not displayed along the vertical axis 203 in this example embodiment.

When the reverse navigation option 600 is initially placed in the focus area 204, according to one embodiment, the user interface 200 initially displays the closest ancestor category 802 to the level 106 displayed above the horizontal axis 202 in the focus area 204. Further, the user interface 200 initially displays successively distant ancestor categories 802 in successive order above the focus area 204. Thus, in this example, the "HBO" ancestor category 802 (e.g., the grandparent of level 106e displayed along the horizontal axis 202) is initially displayed in the focus area 204 and the "On Demand" ancestor category 802 (e.g., the great-grandparent of level 106e) is initially displayed above and adjacent to the focus area 204.

In one embodiment, the user interface 200 also displays categories 804 (e.g., "Channels") along the vertical axis 203 that are not direct ancestors of the categories 102 in the currently displayed level 106 (e.g., level 106e) along the horizontal axis 202. In certain configurations, the non-ancestor categories 804 may even include ones that are not in the same hierarchy 100. As illustrated, the "Channels" category 804 displayed along the vertical axis 203 allows the user to quickly navigate out of the video-on-demand (VOD) hierarchy to view what is (or will be) presented on live television. In one embodiment, the user may selectively choose any of the categories 102 from any of the levels 106 in FIG. 100 to be included as a non-ancestor category 804 along the vertical axis 203 with the ancestor categories 802 to provide quicker access to the selected category 102.

Figure 9:
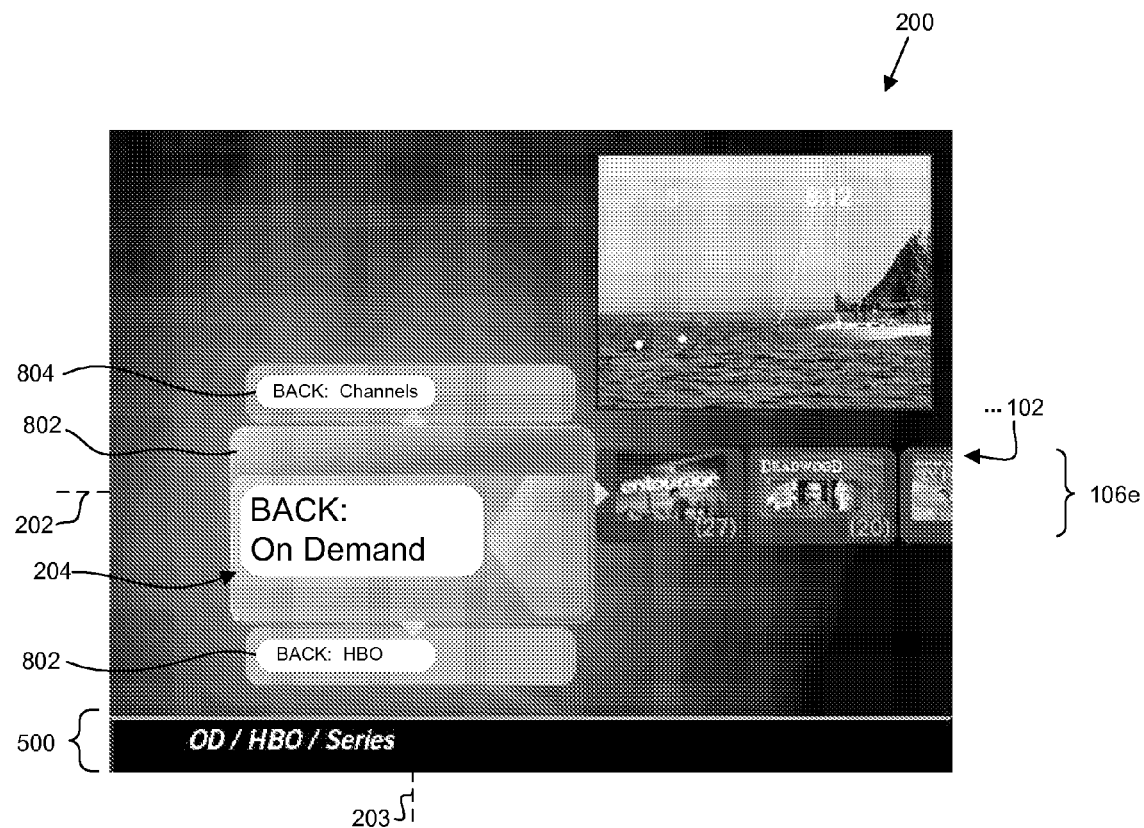
FIG. 9 is a eighth view of an exemplary user interface for navigating the hierarchy of FIG. 1 including an embodiment of a reverse navigation option.

In response to a user input, the user interface 200 scrolls the ancestor categories 802 (and any non-ancestor categories 804) along the vertical axis 203 through the focus area 204. For example, FIG. 9 illustrates the user interface 200 after the user has scrolled the "On Demand" ancestor category 802 into the focus area 204. An artisan will recognize from the disclosure herein that if there are several ancestor categories 802 displayed along the vertical axis 203, then the ancestor categories 802 and non-ancestor category(ies) 804 may be scrolled in and out of view in a loop on the top and bottom of the user interface 200 along the vertical axis 203, as discussed above. Further, the vertical axis 203 may include indicia at a point where the loop begins to repeat itself.

Figure 10:
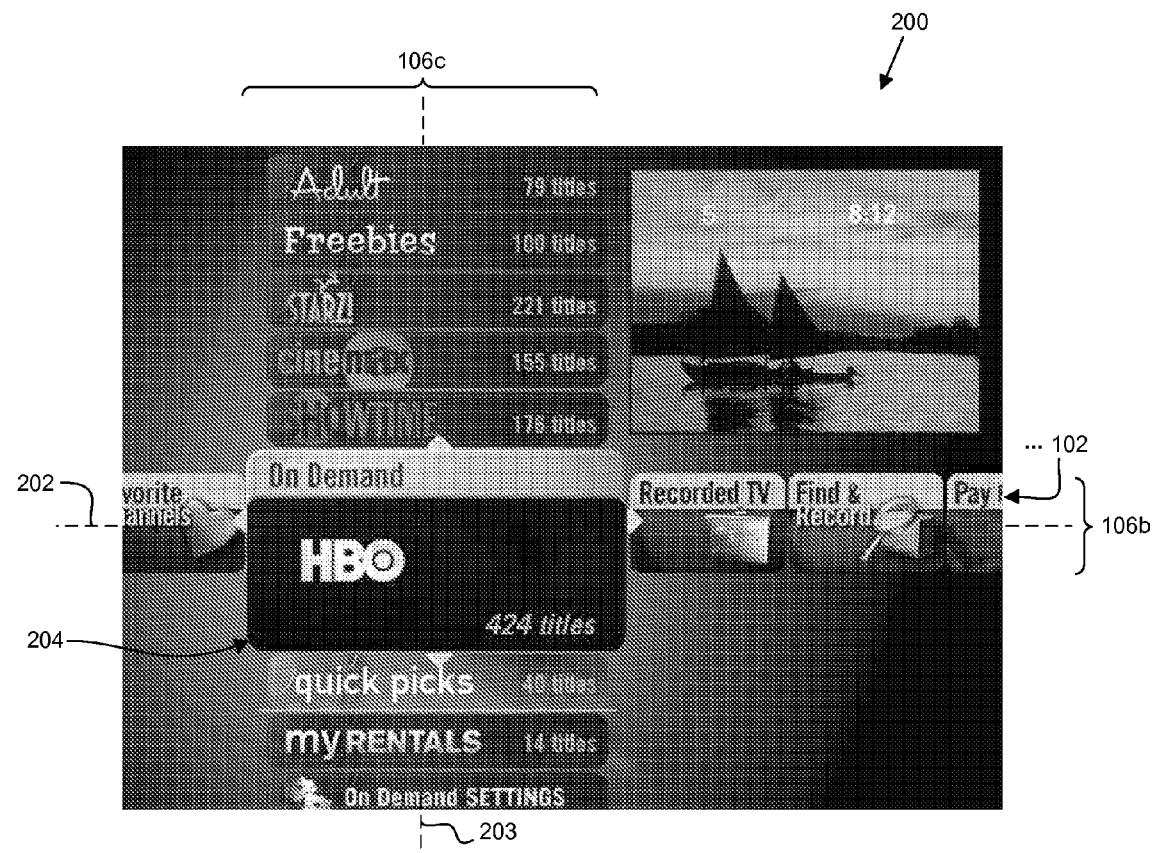
FIG. 10 is a ninth view of an exemplary user interface for navigating the hierarchy of FIG. 1 including an embodiment of a reverse navigation option.

With the "On Demand" ancestor category 802 placed in the focus area 204, the user may continue to scroll along either the horizontal axis 202 or the vertical axis 203. Alternatively, the user may select the "On Demand" ancestor category 802 from the focus area 204 in order to return to level 106b. For example, FIG. 10 illustrates the user interface 200 after the "On Demand" ancestor category 802 has been selected from the focus area 204. As shown, selecting the "On Demand" ancestor category 802 replaces the categories 102 previously displayed along the horizontal axis 202 (e.g., Entourage, Deadwood, etc.) from level 106e with the categories 102 (e.g., Favorite Channels, On Demand, Recorded TV, Find & Record, etc.) from level 106b.

In one embodiment, the user interface 200 automatically places the last category 102 selected from the level 106 corresponding to the selected ancestor category 802 in the focus area 204. Thus, because the user previously navigated through the "On Demand" category 102 to arrive at level 106e in this example, the user interface 200 places the "On Demand" category 102 from level 106b in the focus area 204 and its siblings along the horizontal axis 202. However, in another embodiment, the user interface 200 automatically places a default category from the selected level (e.g., level 106b) in the focus area 204. For example, the "Favorite Channels" category 102 may be selected as the default category such that the user interface 200 initially places the "Favorite Channels" category 102 in the focus area 204 whenever the categories 102 corresponding to level 106b are initially displayed along the horizontal axis 202.

After being in the focus area 204 for a period of time (e.g., 0.5 seconds), the children categories 102 (e.g., Adult, Freebies, Starz!, Cinemax, Showtime, HBO, Quick Picks, My Rentals, etc.) of the "On Demand" category 102 are displayed along the vertical axis 203. The user may then selectively scroll the horizontal axis 202 or the vertical axis 203 through the focus area 204 to select a category 102 therefrom.

Although not shown in FIG. 10, the user interface 200 may continue to display the reverse navigation option 600 along the horizontal axis 202 with the categories 102 of level 106b. In one embodiment, placing the reverse navigation option 600 in the focus area 204 causes the vertical axis 203 to display a forward navigation option (not shown) to allow the user to return to a previous child level 106. For example, after using the reverse navigation option 600 to navigate from level 106e to level 106b, the user may then use the forward navigation option to return to level 106e.

Figure 11:
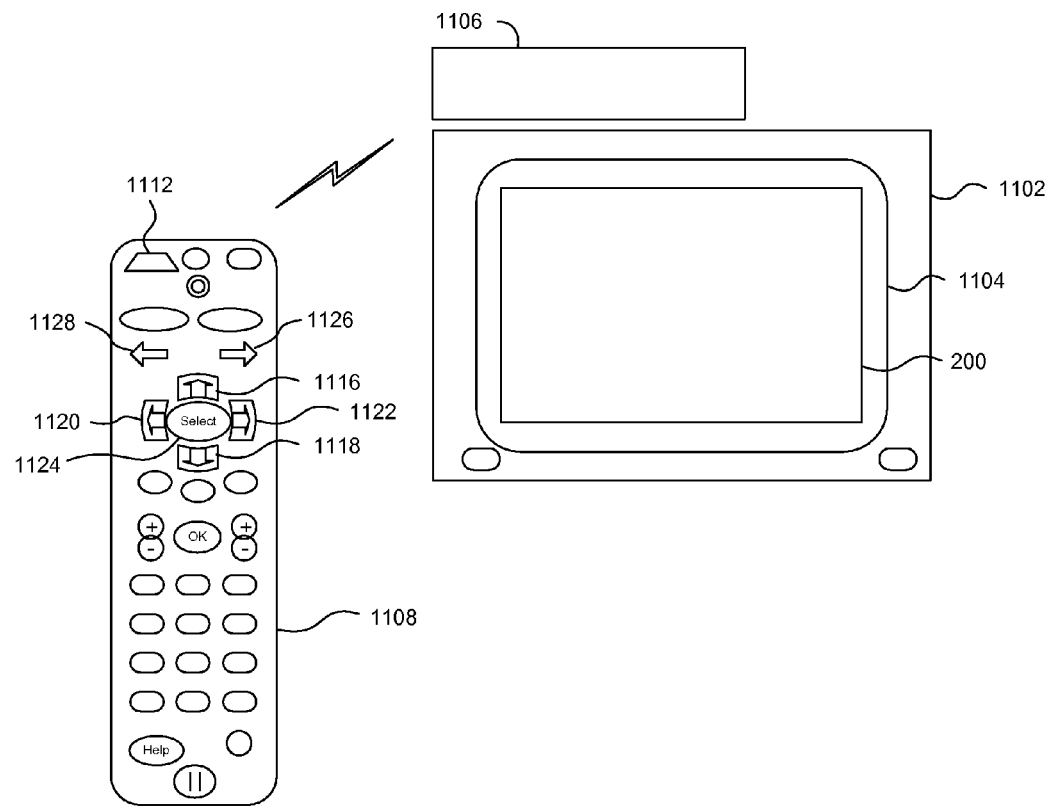
FIG. 11 is a block diagram of an exemplary system for implementing the user interface of FIGS. 2-10.

Referring to FIG. 11, there is shown a block diagram of an interactive television (ITV) system 1100 for providing a user interface 200 of the type illustrated in FIGS. 2-10. The ITV system 1100 may include, in one embodiment, a television (TV) 1102 or other display device having a display screen 1104, a set-top box (STB) 1106, and a remote control 1108.

The STB 1106 may serve as a gateway between the TV 1102 and a broadband communication network (not shown), such as a cable television network or a direct broadcast satellite (DBS) network. One commercially-available example of an STB 1106 is the Motorola DCT5000® interactive set-top terminal.

The STB 1106 receives encoded television signals and other data from the broadband or satellite network and processes the same for display on the display screen 1104. The STB 1106 may also include hardware and software for providing the user interface 200, as described in FIGS. 2-10. In alternative embodiments, the STB 1106 may be integrated into the TV 1102 or may be embodied within a personal computer (PC), mobile computing device, or the like.

The remote control 1108 is provided for convenient remote operation of the STB 1106 and/or the TV 1102. The remote control 1108 may include a wireless transmitter 1112 for transmitting control signals to a corresponding wireless receiver (not shown) within the STB 1106 using radio frequency (RF) or infrared (IR) transmission techniques.

In addition, the remote control 1108 may include a number of buttons or other similar controls. For instance, the remote control 1108 may include an "Up" button 1116, a "Down" button 1118, a "Left" button 1120, a "Right" button 1122 (referred to collectively as "directional buttons"), and a "Select" button 1124. In an embodiment, the remote control 1108 may further include a "Forward" button 1126 and a "Backward" button 1128. Of course, a variety of other buttons or controls may be provided. In alternative implementations, the functionality of the remote control 1108 may be provided by a keyboard, mouse, or other suitable input device.

An ITV system 1100 typically provides access to a plurality of selectable options, such as channels, programs, applications, digital media files, etc. For instance, an ITV system 1100 may provide access to literally hundreds of broadcast TV channels, video-on-demand (VOD) channels, music channels, and the like. Additionally, an ITV system 1100 may provide access to a number of interactive channels or applications, including web browsers, e-mail programs, chat clients, personal video recorder (PVR) applications, contact directories, and the like. Furthermore, an ITV system 1100 may store or provide access to stored PVR recordings, digital photographs, audio (MP3) files, or other forms of digital media.

Figure 12:
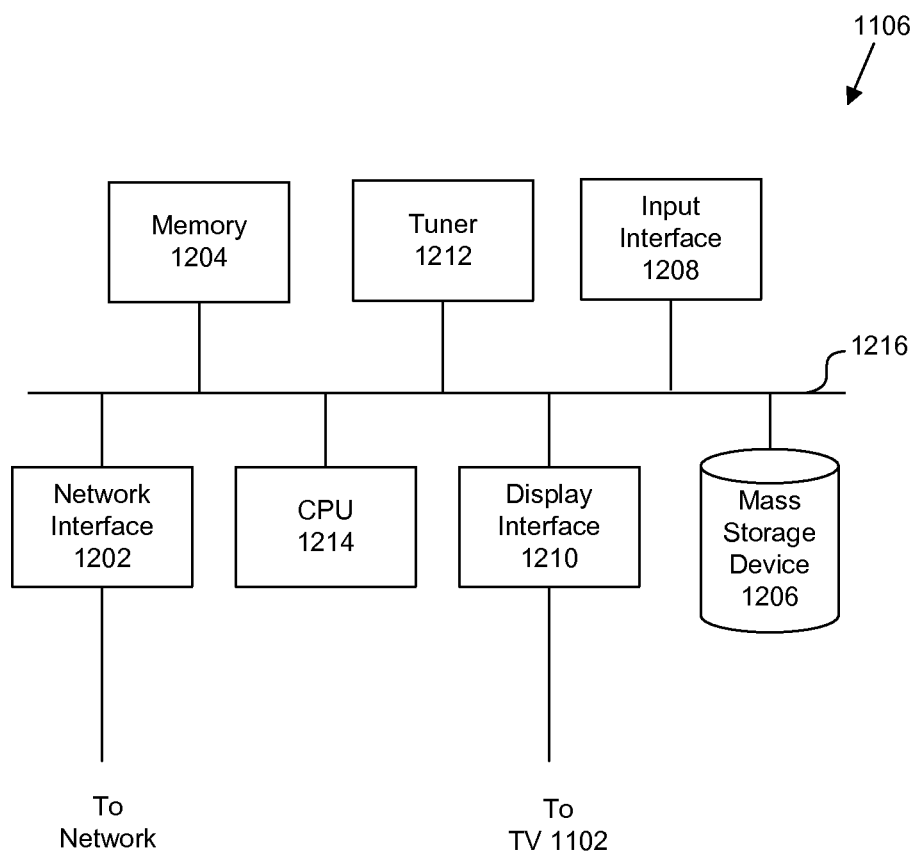
FIG. 12 is a block diagram of a set top box.

FIG. 12 is a schematic block diagram of an STB 1106 according to one embodiment. The illustrated components may be implemented using any suitable combination of hardware, software, and/or firmware. In one configuration, the STB 1106 includes a network interface 1202 for communicating with a broadband network, as discussed above. The network interface 1202 may conform, for example, to the DOCSIS (Data Over Cable Service Interface Specification) and/or DAVIC (Digital Audio-Visual Council) cable modem standards.

The STB 1106 may further include a memory 1204, such as a random access memory (RAM). The memory 1204 may store an operating system (OS) for the STB 1106 (e.g., Windows CE® or Linux®), application program code, and various types of data. In one embodiment, the memory 1204 stores a hierarchy 100 of information, as illustrated in FIG. 1, including one or more categories 102 and assets 104. The STB 1106 may further include a mass storage device 1206, such as a hard disk drive, optical storage device, or the like, for storing application programs and associated data, buffered video streams, and the like.

An input interface 1208 may be provided for receiving commands from an input device, such as the remote control 1108 of FIG. 11. The input interface 1208 may detect, for example, the user pressing the "Up" or "Down" buttons 1116, 1118 on the remote control 1108.

The STB 1106 may further include a display interface 1210 for rendering graphical data, including the user interface 200, on the TV 1102 or other suitable display device. A tuner 1212 may also be included for demodulating and demultiplexing selected video streams received by the STB 1106 from the broadband network.

A CPU 1214 controls the operation of the STB 1106, including the other components described above, which may be in electrical communication with the CPU 1214 via a bus 1216. The CPU 1214 may be embodied as a microprocessor, a microcontroller, a digital signal processor (DSP), or other device known in the art. The CPU 1214 may perform logical and arithmetic operations based on program code and data stored within the memory 1204 or the mass storage device 1206.

Although not shown in FIG. 12, the STB 1106 may include other components that allow the STB 1106 to communicate with and/or control, via wireless or other means, multiple televisions, personal computers, and other media storage and presentation devices. Of course, FIG. 12 illustrates only one possible configuration of an STB 1106. An artisan will recognize that various other architectures and components may be provided.

Figure 13:
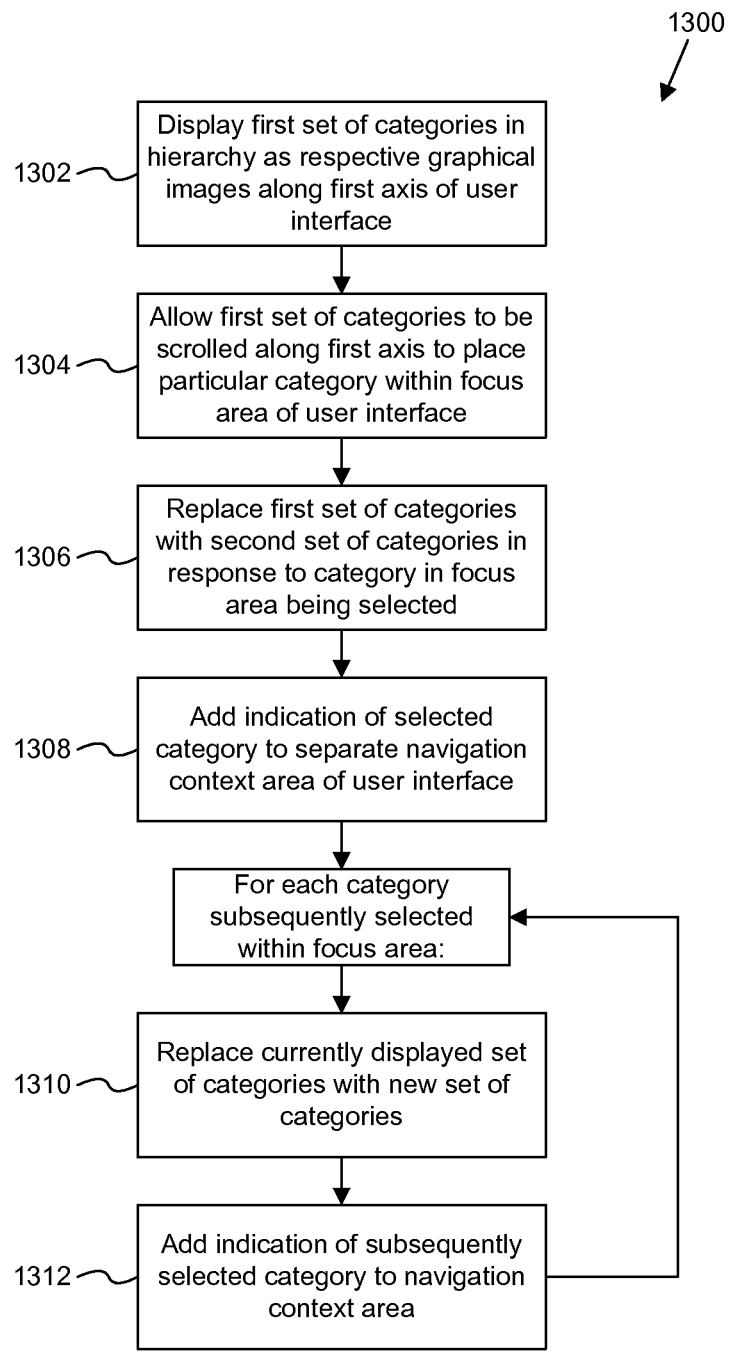
FIGS. 13-17 are flowcharts of methods for facilitating navigation of a hierarchy.

FIG. 13 is a flowchart of a method 1300 for facilitating navigation of a hierarchy of categories. The method 1300 may include displaying 1302 a first set of categories in the hierarchy as respective graphical images along a first axis of a user interface. The method 1300 may also include allowing 1304 the first set of categories to be scrolled along the first axis to place a particular category within a focus area of the user interface.

In one embodiment, the method 1300 further includes replacing 1306 the first set of categories with a second set of categories in response to the category in the focus area being selected. The second set of categories may comprise, for example, one or more children in the hierarchy of the selected category. Additionally, the method 1300 may include adding 1308 an indication of the selected category to a separate navigation context area of the user interface.

For each category subsequently selected within the focus area, the method 1300 may further include replacing 1310 the currently displayed set of categories with a new set of categories, the new set of categories comprising one or more children in the hierarchy of the subsequently selected category, and adding 1312 an indication of the subsequently selected category to the navigation context area.

Figure 14:
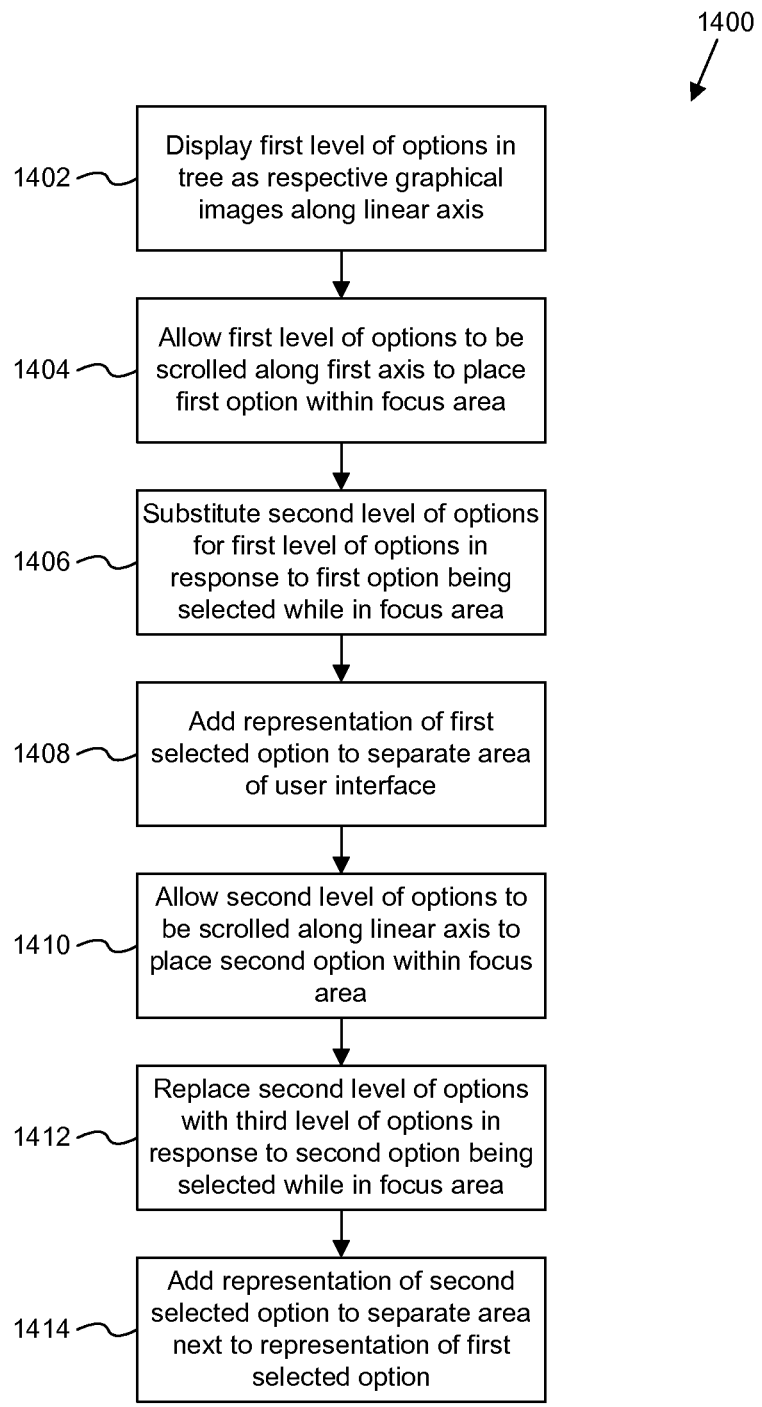

FIG. 14 is a flowchart of a method 1400 for facilitating navigation of an option tree including a plurality of levels. The method 1400 may include displaying 1402 a first level of options in the tree as respective graphical images along a linear axis. The method 1400 may also include allowing 1404 the first level of options to be scrolled along the first axis to place a first option within a focus area.

In one embodiment, the method 1400 further includes substituting 1406 a second level of options for the first level of options in response to the first option being selected while in the focus area. The second level of options may comprise, for example, sub-options in the tree of the selected option. The method 1400 may also include adding 1408 a representation of the first selected option to a separate area of the user interface.

In addition, the method 1400 may include allowing 1410 the second level of options to be scrolled along the linear axis to place a second option within the focus area and replacing 1412 the second level of options with a third level of options in response to the second option being selected while in the focus area. The third level of options may comprise suboptions in the tree of the second selected option. Furthermore, the method 1400 may include adding 1414 a representation of the second selected option to the separate area next to the representation of the first selected option.

Figure 15:
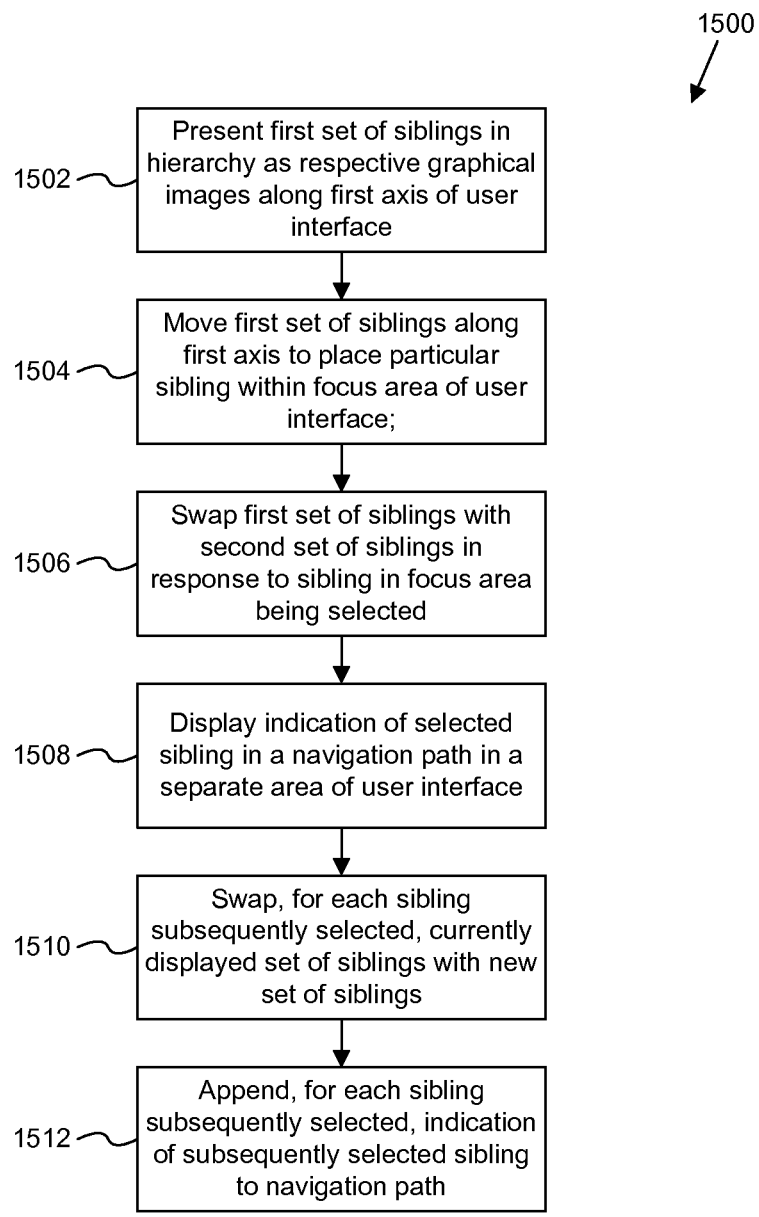

FIG. 15 is a flowchart of a method 1500 for facilitating navigation of a hierarchy. The method 1500 may include presenting 1502 a first set of siblings in the hierarchy as respective graphical images along a first axis of a user interface. The method 1500 may also include moving 1504 the first set of siblings along the first axis to place a particular sibling within a focus area of the user interface. The method 1500 may further include swapping 1506 the first set of siblings with a second set of siblings in response to the sibling in the focus area being selected. The second set of siblings may comprise, for example, one or more children in the hierarchy of the selected sibling.

In one embodiment, the method 1500 may additionally include displaying 1508 an indication of the selected sibling in a separate navigation path within the user interface. Furthermore, the method 1500 may include swapping 1510, for each sibling subsequently selected within the focus area, the currently displayed set of siblings with a new set of siblings. The new set of siblings may comprise, in one embodiment, one or more children in the hierarchy of the subsequently selected sibling. The method 1500 may also include appending 1512, for each sibling subsequently selected within the focus area, an indication of the subsequently selected sibling to the navigation path.

Figure 16:
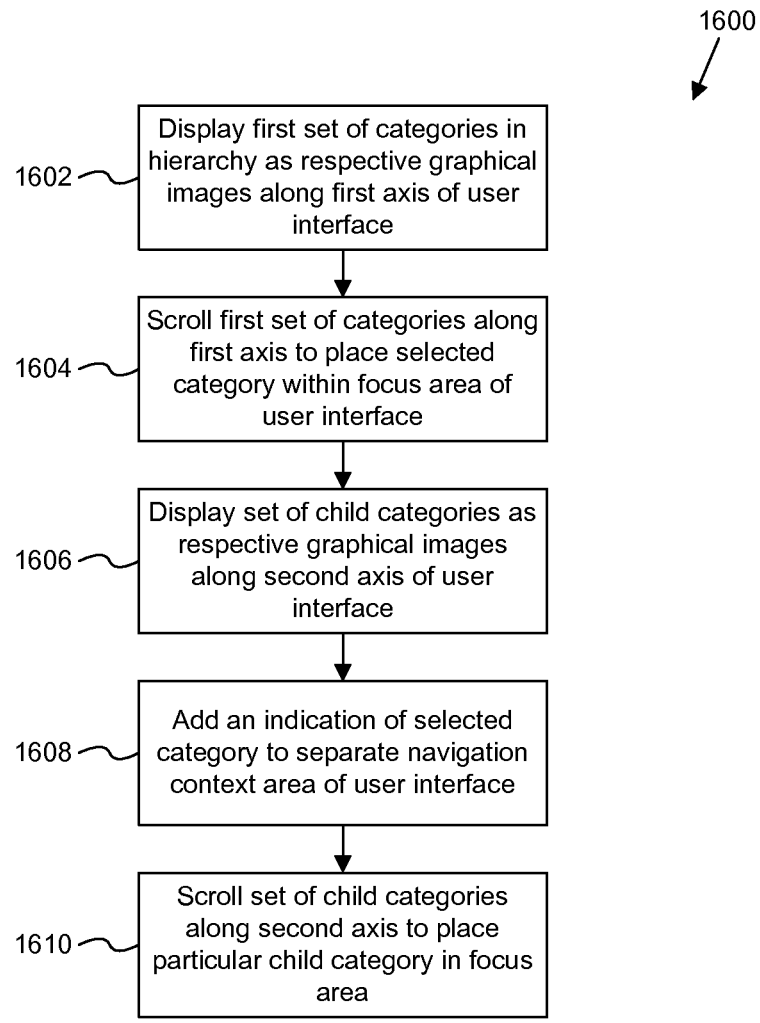

FIG. 16 is a flowchart of a method 1600 for facilitating navigation of a hierarchy. The method 1600 may include displaying 1602 a first set of categories in the hierarchy as respective graphical images along a first axis of a user interface. The method may further include scrolling 1604 the first set of categories along the first axis to place a selected category within a focus area of the user interface.

In one embodiment, the method 1600 includes displaying 1606 a set of child categories relative to the category in the focus area as respective graphical images along a second axis of the user interface. The second axis may be perpendicular to the first axis. In addition, the method 1600 may include adding 1608 an indication of the selected category to a separate navigation context area of the user interface. The method may also include scrolling 1610 the set of child categories along the second axis to place a particular child category in the focus area.

Figure 17:
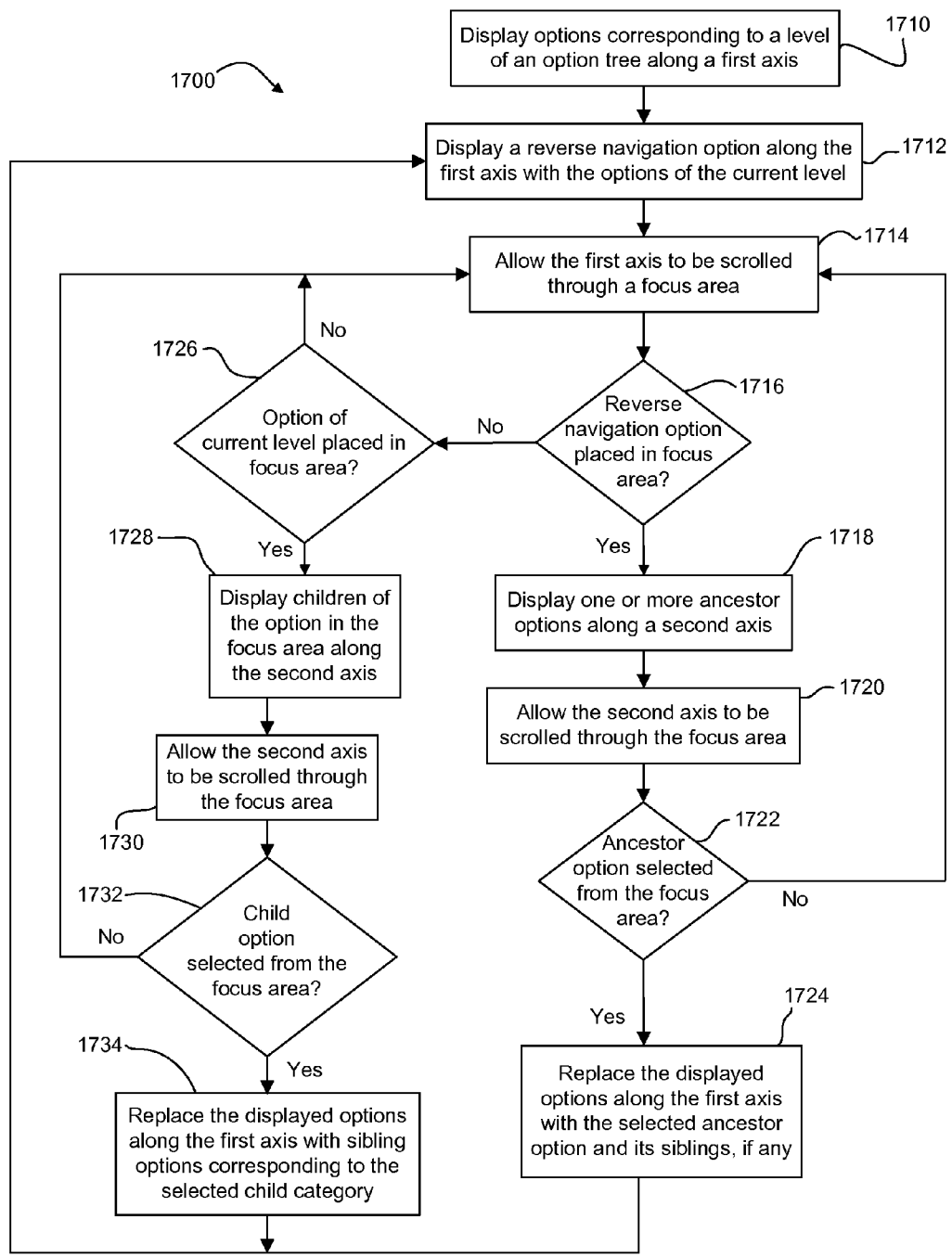

FIG. 17 is a flowchart of a method 1700 for navigating a hierarchy of categories according to one embodiment. The method 1700 includes displaying 1710 options corresponding to a level of an option tree along a first axis. The method 1700 further includes displaying 1712 a reverse navigation option along the first axis with the options of the current level and allowing 1714 the first axis to be scrolled through a focus area.

The method 1700 queries 1716 whether the reverse navigation option has been placed in the focus area. As discussed above, in one embodiment, placing the reverse navigation option in the focus area comprises pausing the scrolling for at least a period of time (e.g., 0.5 seconds) with the reverse navigation option in the focus area. If the reverse navigation option has been placed in the focus area, the method 1700 displays 1718 one or more ancestor options along a second axis. In one embodiment, the first axis intersects the second axis at substantially a right angle at the focus area.

The method 1700 also allows 1720 the second axis to be scrolled through the focus area and queries 1722 whether a particular ancestor option has been selected from the focus area. If a particular ancestor option has been selected from focus area, then the method 1700 replaces 1724 the displayed options along the first axis with the selected ancestor option and its siblings, if any, and again displays 1712 the reverse navigation option along the first axis with the options of the current level (e.g., level corresponding to the selected ancestor option). If a particular ancestor option has not been selected from the focus area, then the method 1700 again allows 1714 the first axis to be scrolled through the focus area.

If the reverse navigation option has not been placed in the focus area, the method 1700 queries 1726 whether an option of the current level has been placed in the focus area. If not, the method 1700 continues to allow 1714 the first axis to be scrolled through the focus area. If a particular option of the current level has been placed in the focus area, then the method 1700 displays 1728 children of the option in the focus area along the second axis. The children may include, for example, categories of options or information assets, as discussed above.

The method 1700 then allows 1730 the second axis to be scrolled through the focus area and queries 1732 whether a particular child option has been selected from the focus area. If a particular child option has been selected from the focus area, the method 1700 replaces 1734 the displayed options along the first axis with sibling options corresponding to the selected child category and again displays 1712 the reverse navigation option along the first axis with the options of the current level (e.g., the sibling options corresponding to the selected child category). If a particular child option has not been selected from the focus area, the method 1700 again allows 1714 the first axis to be scrolled through the focus area.

Various modifications, changes, and variations apparent to those of skill in the art may be made in the arrangement, operation, and details of the methods and systems of the disclosure without departing from the spirit and scope of the disclosure. Thus, it is to be understood that the embodiments described above have been presented by way of example, and not limitation, and that the invention is defined by the appended claims.

What is claimed is:

1. A method for navigating a hierarchy of categories, the method comprising:
  displaying first categories as respective graphical images along a first axis of a user interface, the first categories being siblings in a level of the hierarchy;
  displaying a reverse navigation option along the first axis with the first categories, the reverse navigation option comprising one of the first categories which is operable to be selected;
  allowing the first categories and the reverse navigation option to be scrolled along the first axis to place the reverse navigation option within a focus area of the user interface;
  in response to the reverse navigation option being placed within the focus area, displaying a plurality of ancestor categories of the first categories, the plurality of ancestor categories displayed as respective graphical images along a second axis of the user interface that passes through the focus area, at least one of the ancestor categories displayed along the second axis being from a different level of the hierarchy than another ancestor category displayed along the second axis; and in response to an ancestor category from the second axis being selected within the focus area, replacing the first categories with second categories along the first axis.

2. The method of claim 1, wherein the second categories comprise:
the selected ancestor category; and
one or more sibling categories of the selected ancestor category.

3. The method of claim 1, wherein the focus area defines an intersection of the first axis and the second axis.

4. The method of claim 3, wherein selecting the ancestor category from the second axis comprises:
allowing the plurality of ancestor categories to be scrolled along the second axis through the focus area;
determining that the selected ancestor category has been placed in the focus area; and
receiving a user-selection of the selected ancestor category in the focus area.

5. The method of claim 1, wherein placing the reverse navigation option within the focus area comprises pausing on the reverse navigation option within the focus area for at least approximately 0.5 second.

6. The method of claim 1, wherein displaying the first categories as respective graphical images along the first axis comprises initially displaying the first categories on a first side of the focus area along the first axis.

7. The method of claim 6, wherein displaying the reverse navigation option comprises initially displaying the reverse navigation option adjacent to the focus area on a second side of the focus area, the second side being opposite to the first side along the first axis.

8. The method of claim 7, wherein allowing the first categories and the reverse navigation option to be scrolled along the first axis through the focus area comprises allowing one or more of the first categories and the reverse navigation option to be scrolled in and out of view in a loop on both sides of the user interface along the first axis.

9. The method of claim 1, wherein replacing the first categories with the second categories comprises placing a predetermined category of the second categories within the focus area.

10. The method of claim 9, wherein the predetermined category comprises a sibling category of the selected ancestor category.

11. The method of claim 9, wherein the predetermined category comprises the selected ancestor category.

12. The method of claim 9, further comprising displaying third categories as respective graphical images along the second axis, the third categories being children of the predetermined category.

13. The method of claim 1, wherein replacing the first categories with the second categories comprises placing a most-recently selected category of the second categories within the focus area.

14. The method of claim 1, further comprising:
displaying a non-ancestor category relative to the first categories along the second axis with the plurality of ancestor categories;
allowing the non-ancestor category to be selected from the second axis; and
in response to the non-ancestor category being selected, replacing the first categories with third categories, the third categories comprising one or more children categories of the non-ancestor category.

15. The method of claim 14, wherein the non-ancestor category comprises a channel category corresponding to currently broadcast television programs on respective television channels.

16. The method of claim 1, further comprising:
displaying a forward navigation option along the second axis with the plurality of ancestor categories;
allowing the plurality of ancestor categories and the forward navigation option to be scrolled along the second axis through the focus area of the user interface;
in response to the forward navigation option being selected from the focus area, displaying a previously selected descendant category of the first categories along the first axis.

17. The method of claim 1, further comprising adding an indication of the selected ancestor category to a separate navigation context area of the user interface.

18. The method of claim 17, further comprising, for each subsequently selected category:
replacing the currently displayed categories along the first axis with a new set of categories, the new set of categories comprising one or more children in the hierarchy of the subsequently selected category; and
adding an indication of the subsequently selected category to the navigation context area.

19. The method of claim 18, wherein each indication of a subsequently selected category is displayed in the navigation context area adjacent to an indication of the previously selected category.

20. The method of claim 1, wherein at least a portion of the categories in the hierarchy comprise one or more assets, the method further comprising:
displaying in connection with a category an indication of the number of assets associated with the category and all children of the category, if any, in the hierarchy.

21. The method of claim 1, further comprising:
allowing the second categories to be scrolled along the first axis to place a particular category of the second categories within the focus area of the user interface; and
displaying third categories as respective graphical images along the second axis, the third categories being children of the particular category placed within the focus area.

22. A non-transitory computer accessible medium including program instructions for causing a computer to perform a method for navigating between levels in an option tree, the method comprising:
displaying first options along a first axis of a user interface, the first options corresponding to a first level of the option tree;
displaying a reverse navigation option along the first axis with the first options;
allowing the first options and the reverse navigation option to be scrolled along the first axis through an intersection with a second axis of the user interface;
displaying a second option along the second axis in response to the reverse navigation option being placed at the intersection of the first axis and the second axis, the second option corresponding to a second level of the option tree, the first level being a sublevel of the second level; and
in response to the second option from the second axis being selected within the intersection, replacing the first options displayed along the first axis with the second option and one or more third options corresponding to the second level.

23. The computer accessible medium of claim 22, further operable to cause the computer to perform the method comprising displaying fourth options along the second axis, the fourth options corresponding to a third level of the option tree, the third level being a sublevel of the second level.

24. The computer accessible medium of claim 23, wherein the fourth options are displayed along the second axis in response to the second option being placed at the intersection of the first axis and the second axis.

25. The computer accessible medium of claim 23, wherein the fourth options are displayed along the second axis in response to one of the one or more third options being placed at the intersection of the first axis and the second axis.

26. The computer accessible medium of claim 22, wherein displaying the first options along the first axis comprises initially displaying the first options on a first side of the intersection along the first axis.

27. The computer accessible medium of claim 26, wherein displaying the reverse navigation option comprises initially displaying the reverse navigation option adjacent to the intersection on a second side of the intersection, the second side being opposite to the first side along the first axis.

28. The computer accessible medium of claim 27, wherein allowing the first options and the reverse navigation option to be scrolled along the first axis through the intersection comprises allowing one or more of the first options and the reverse navigation option to be scrolled in and out of view in a loop on both sides of the user interface along the first axis.

29. The computer accessible medium of claim 22, wherein replacing the first options with the second option and one or more third options comprises placing a predetermined one of the third options at the intersection.

30. The computer accessible medium of claim 22, wherein replacing the first options with the second option and one or more third options comprises placing the second options at the intersection.

31. The computer accessible medium of claim 22, further operable to cause the computer to perform the method comprising displaying a fourth option along the second axis with the second option, the fourth option being a sibling of the second option in the option tree.

32. The computer accessible medium of claim 31, wherein the fourth option comprises a channel option corresponding to currently broadcast television programs on respective television channels.

33. The computer accessible medium of claim 22, further operable to cause the computer to perform the method comprising:
    displaying a forward navigation option along the second axis with the second option; and
    in response to the forward navigation option being selected from the second axis, displaying a fourth option along the first axis, the fourth option being a previously selected sub-option of the first options.

34. The computer accessible medium of claim 22, further operable to cause the computer to perform the method comprising adding an indication of the second option to a separate navigation context area of the user interface.

35. The computer accessible medium of claim 34, further operable to cause the computer to perform the method comprising, for each subsequently selected option:
    replacing the currently selected options along the first axis with a new set of options, the new set of options comprising one or more children in the option tree of the subsequently selected option; and
    adding an indication of the subsequently selected option to the navigation context area.

36. The computer accessible medium of claim 35, wherein each indication of a subsequently selected category is displayed in the navigation context area adjacent to an indication of the previously selected category.

37. The computer accessible medium of claim 22, wherein at least a portion of the options in the option tree comprise one or more assets, the computer accessible medium operable to cause the computer to perform the method further comprising:
    displaying in connection with an option an indication of the number of assets associated with the option and all children of the option, if any, in the option tree.

38. A system for navigating a plurality of categories in a hierarchy, the system comprising:
    a tuner for demodulating and demultiplexing video streams;
    an input interface for receiving user commands; and
    a user interface for allowing a user to select, through the input interface, one or more of the video streams for display, the user interface comprising:
        a first axis for displaying respective graphical images for:
            a first set of sibling categories in a hierarchy of categories; and
            a reverse navigation option;
        a focus area along the first axis, the respective graphical images for the first set of sibling categories and the reverse navigation option configured to be selectively scrolled along the first axis through the focus area using the input interface; and
        a second axis intersecting the first axis at substantially a right angle, the second axis displaying respective graphical images for a plurality of ancestor categories of the first set of sibling categories in response to the reverse navigation option being placed in the focus area, at least one of the ancestor categories displayed along the second axis being from a different level of the hierarchy than another ancestor category displayed along the second axis.

39. The system of claim 38, wherein the respective graphical images for the plurality of ancestor categories are configured to be selectively scrolled along the second axis through the focus area so as to place a particular ancestor category within the focus area.

40. The system of claim 39, wherein the first axis is configured to replace the first set of sibling categories with a second set of sibling categories in the hierarchy in response to the particular ancestor category being actively selected from the focus area, the second set of sibling categories comprising the selected ancestor category and one or more siblings of the selected ancestor category.

41. A method for navigating a hierarchy of categories, the method comprising:
    displaying first categories as respective graphical images along a first axis of a user interface, the first categories being siblings in a level of the hierarchy;
    selectively displaying ancestor categories of the first categories as respective graphical images along a second axis of the user interface, the second axis intersecting the first axis at substantially a right angle, at least one of the ancestor categories displayed along the second axis being from a different level of the hierarchy than another ancestor category displayed along the second axis;
    allowing the ancestor categories to be scrolled along the second axis to place a particular ancestor category within a focus area; and
    in response to the particular ancestor category in the focus area being selected, replacing the first categories with second categories along the first axis.

42. The method of claim 41, wherein the second categories comprise:
- the selected ancestor category; and
- one or more sibling categories of the selected ancestor category.

43. A system comprising:
- means for displaying first options along a first axis of a user interface, the first options corresponding to a first level of an option tree;
- means for displaying a reverse navigation option along the first axis with the first options;
- means for allowing the first options and the reverse navigation option to be scrolled along the first axis through an intersection with a second axis of the user interface;
- means for displaying a second option along the second axis in response to the reverse navigation option being placed at the intersection of the first axis and the second axis, the second option corresponding to a second level of the option tree, the first level being a sublevel of the second level; and
- means for replacing the first options with third options along the first axis in response to the second option from the second axis being selected within the intersection, the third options corresponding to a third level of the option tree, the third level being a sublevel of the second level.

* * * * *